Aug. 5, 1969  R. W. HIPPEN  3,459,041
FLUID METERING APPARATUS
Filed Dec. 19, 1966  3 Sheets-Sheet 1
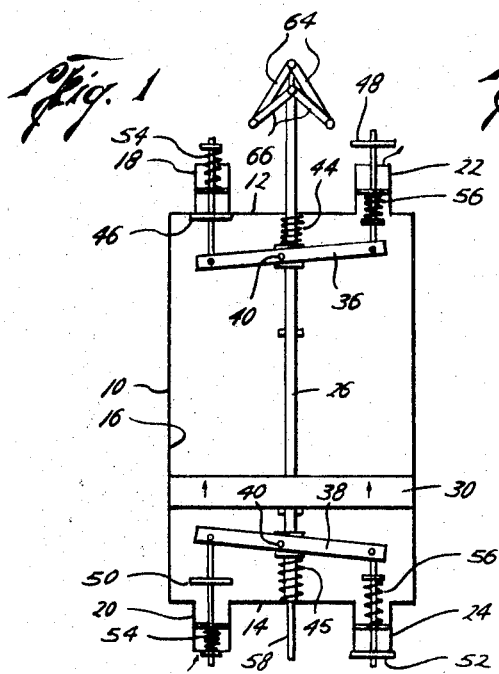
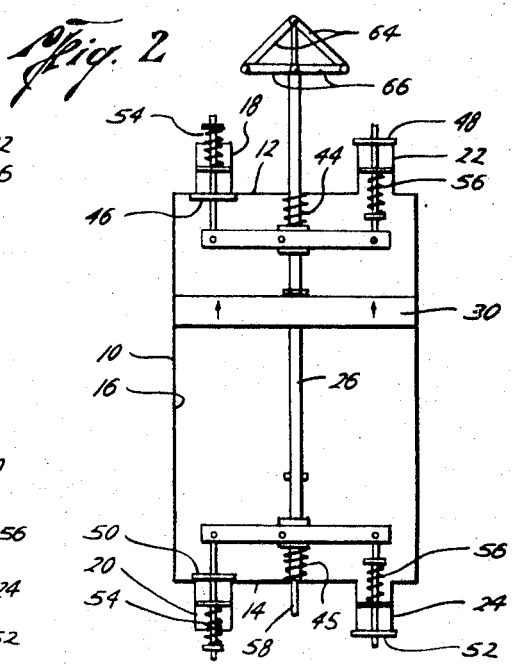
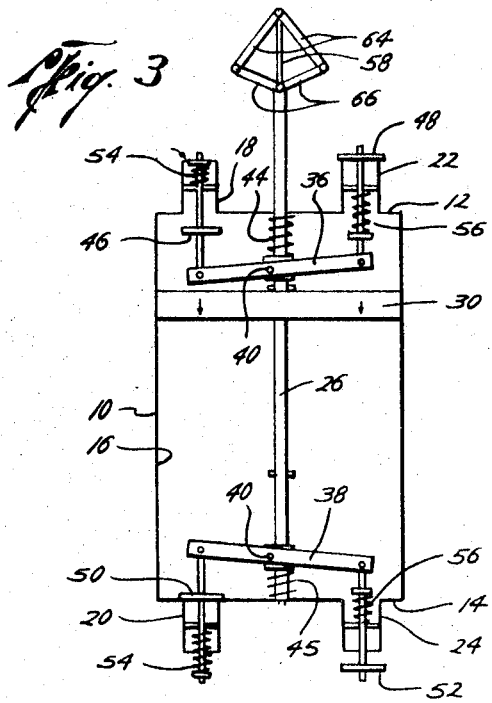
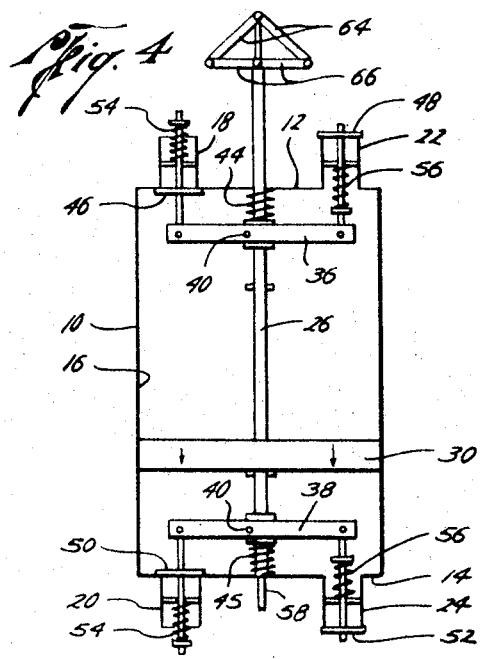
Ralph W. Hippen
INVENTOR.
BY
Charles E. Lightfoot
ATTORNEY

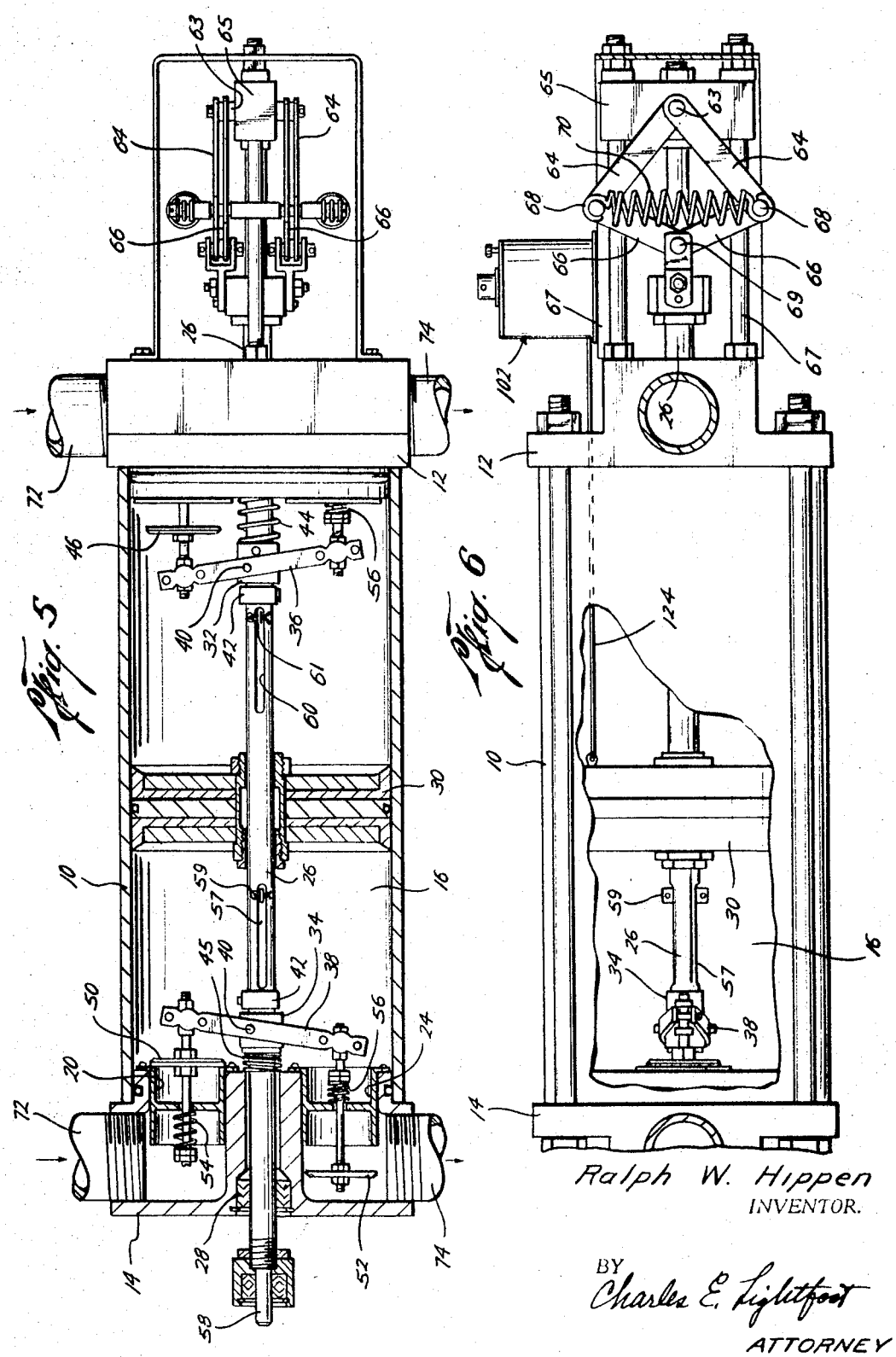

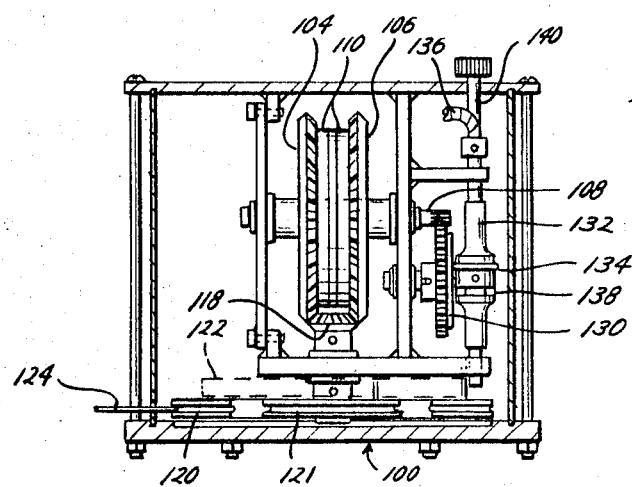
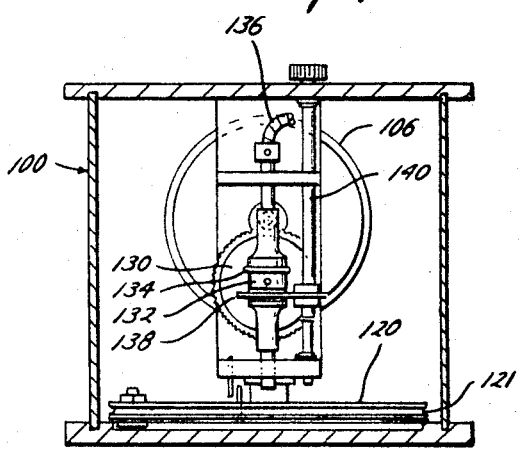
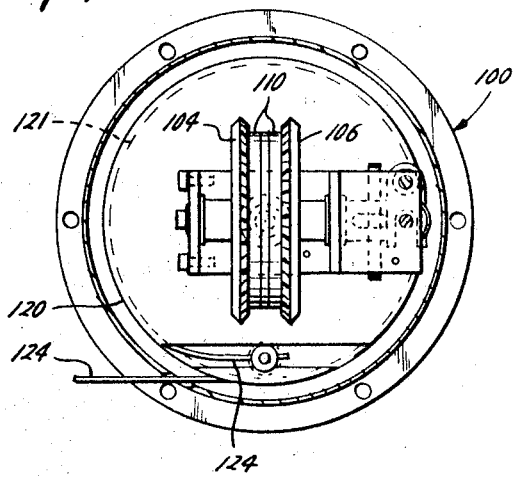
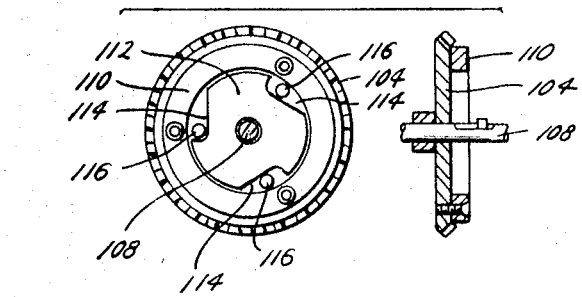

United States Patent Office 3,459,041
Patented Aug. 5, 1969

3,459,041
FLUID METERING APPARATUS
Ralph W. Hippen, 1520 Welch St.,
Houston, Tex. 77006
Filed Dec. 19, 1966, Ser. No. 602,792
Int. Cl. G01f 3/16
U.S. Cl. 73—239        7 Claims

ABSTRACT OF THE DISCLOSURE

A fluid meter of the piston and cylinder type having an inlet and an outlet valve at each end and including means for actuating the valves to cause all of the valves to close momentarily at the time of the reversal of the movement of the piston to increase the accuracy of measurement of the fluid passing through the meter.

---

The invention relates to fluid metering apparatus of the positive displacement, cylinder and piston type, in which fluid is admitted to one end of a cylinder and discharged at the other end to cause a piston in the cylinder to be moved in one direction therein and wherein means is provided for reversing the flow of fluid to move the piston in the other direction whereby the volume of fluid which passes through the apparatus may be measured.

Metering apparatus of this kind commonly has an inlet and an outlet valve at each end of the cylinder and valve operating mechanism is provided which closes the inlet valve and opens the outlet valve at one end of the cylinder while opening the inlet valve and closing the outlet valve at the other end of the cylinder to reverse the flow of fluid when the piston reaches the limit of its movement toward said one end. The reversal of the valves is usually accomplished with a snapping action to reduce as much as possible the time required for reversal.

Such apparatus, as heretofore commonly provided, possesses the disadvantage that the reversing movements of the valves results in the exertion of a back pressure on the piston due to the opening of the inlet valve at one end of the cylinder before the inlet valve at the other end has reached its fully closed position. A further disadvantage is that during the opening and closing movements of the valves the inlet valves and outlet valves will be partly open at the same time, so that for a short time there is a continuance of the outflow while inflow is taking place at one end of the cylinder, which results in an appreciable inaccuracy in the metering of the fluid.

The present invention has for an important object the provision of fluid metering apparatus of the type mentioned which is constructed to substantially eliminate the above disadvantages and whereby the accuracy of metering is greatly improved.

Another object of the invention is to provide fluid metering apparatus of the kind referred to wherein back pressure on the piston at the time of the reversal movements of the valves is substantially prevented.

A further object of the invention is the provision in fluid metering apparatus of the kind referred to of valve actuating mechanism which functions to momentarily close all of the valves at the time of reversal thereby eliminating substantially all of the inaccuracy caused by the inlet and outlet valves being open at the same time at one end of the cylinder.

Briefly described the apparatus of the invention comprises a piston movably disposed in a cylinder having an inlet and an outlet port at each end, and valve mechanism for allowing an inflow of fluid at one end of the cylinder during the outflow of fluid at the other end, and which is operable to reverse the flow of fluid when the piston reaches a predetermined position of its movement toward said other end. The apparatus includes means for causing all of the valves to be moved to closed position momentarily at the time of reversal of the valves, whereby any continuance of the outflow of fluid during the reversal of the valves is prevented and any increase of back pressure on the piston due to continuance of inflow during the reversal of the valves is avoided, thus increasing the accuracy of the apparatus.

The apparatus also includes mechanism for registering the reciprocating movement of the piston whereby the volume of fluid passing through the meter may be recorded.

In the drawings:

FIGURE 1 is a somewhat diagrammatic view, on a reduced scale, illustrating the operation of the apparatus and showing the relative positions of the valves during the movement of the piston in one direction in the cylinder;

FIGURE 2 is a view similar to that of FIGURE 1, showing the valves in their momentarily closed condition at the time of reversal of the valves, when the piston has reached the extreme position of its movement in one direction in the cylinder;

FIGURE 3 is a view similar to that of FIGURE 1, showing the valves in the reversed condition from that of FIGURE 1, immediately following the condition of the apparatus illustrated in FIGURE 2;

FIGURE 4 is a view similar to that of FIGURE 1 showing the valves in their closed condition at the time of reversal of the valves when the piston has reached its extreme position of movement in the other direction of its movement in the cylinder;

FIGURE 5 is a longitudinal, central, cross-sectional view of the apparatus of the invention, showing details of construction of the same, the piston being shown at an intermediate position of its movement in the cylinder and the valves being positioned to allow inflow at one end of the cylinder while outflow is taking place at the other end thereof;

FIGURE 6 is a fragmentary view, partly broken away, and at right angles to that of FIGURE 5;

FIGURE 7 is a side elevational view, on an enlarged scale, of the stroke recording mechanism of the invention, showing details of the structure thereof;

FIGURE 8 is an end view looking at the right end of the stroke recording mechanism as illustrated in FIGURE 7;

FIGURE 9 is a top view looking down on the top of the stroke recording mechanism as illustrated in FIGURE 8; and FIGURE 10 is a detail view showing details of structure of the driving mechanism of the stroke recording mechanism of FIGURES 7, 8 and 9.

Referring to the drawings in greater detail, the invention is illustrated herein in connection with a fluid meter of the piston and cylinder type having a cylinder 10 provided at its opposite ends with end closure members or heads 12 and 14 suitably attached thereto to form a metering chamber 16 into and out of which the fluid to be metered may flow. The closure members have inlet ports 18 and 20 through which fluid may flow into the chamber 16 and outlet ports 22 and 24 through which fluid may flow out of the chamber.

An elongated, tubular, valve operating stem 26 is slidably extended centrally through the end closure members or heads 12 and 14, suitable seal forming means, such as that shown at 28 in FIGURE 5 being provided in each head surrounding the stem to prevent the leakage of fluid from the chamber 16.

Within the chamber 16 a piston 30 is mounted on the stem 26 for sliding movement thereon, which piston is provided with suitable packing, of the usual type, about the stem and in position to form a seal between the piston and cylinder to prevent leakage of fluid past the piston.

The stem 26 carries collars 32 and 34, fixedly mounted thereon on each side of the piston, and upon which rocker arms 36 and 38 respectively are pivotally supported, as by means of pivot pins 40, located at different distances from the ends of the arms. A stop member 42 is attached to the stem 26 for each of the collars 32 and 34 in position to engage the collar to move the collar with the stem toward the adjacent one of the closure members 12 and 14, and the collars are urged away from the adjacent closure members by coil springs 44 and 45 surrounding the stem 26, between the collars and the adjacent closure members.

The closure member 12 has an inlet valve 46 for the inlet port 18 thereof and an outlet valve 48 for the outlet port 22, which valves are connected to opposite ends of the arm 36 for actuation thereby, and the outlet valve 48 being connected to the arm at a greater distance from the pivot pin 40 than the inlet valve 46.

An inlet valve 50 and an outlet valve 52, are also provided for the inlet port 20 and outlet port 24 of the closure member 14, which valves are connected to the arm 38 for actuation thereby in the same manner as the valves 46 and 48.

The inlet valves 46 and 50 are urged toward closed position by means of coil springs 54 surrounding the valve stems and the outlet valves 48 and 52 are urged toward closed position by coil springs 56.

An actuator shaft 58 is slidably extended through the tubular stem 26 and suitable means, not shown, of a usual type, is provided to form a seal between the shaft and stem. The stem 26 has longitudinally, elongated slots 57 and 60 on opposite sides of the piston 30 in which pins 59 and 61, or the like, on the shaft 58 are slidably disposed. The slots 57 and 60 are somewhat longer than the distance of travel of the shaft, so that the pins do not engage the stem at the ends of the slots.

Exteriorly of the cylinder 10, beyond the head 12, the shaft 58 is connected to a sliding block 65, slidably supported on a pair of rods 67 attached to the head, which block is pivotally connected to the ends of pairs of links 64, as by means of a pivot pin 63. The outer end of the tubular stem 26 is pivotally connected to ends of pairs of links 66, as by means of a pivot pin 69, and each link 66 is connected at its other end to the other end of one of the links 64, as by means of pivot pins 68, to form a sort of pantograph arrangement, as best seen in FIGURE 6. Coil springs 70 are extended between and connected at its opposite ends to the pivot pins 68. By this arrangement, the stem 26 and shaft 58 may move longitudinally relative to each other to accomplish the operation of the valves 46, 48, 50 and 52. Thus, in the positions of the valves illustrated in FIGURE 1, only the inlet valve 50 at one end of the cylinder and the outlet valve 48 at the other end of the cylinder are open to permit the inflow and outflow of fluid whereby the piston 30 will be moved in the direction indicated, toward the head 12, the pantagraph arrangement being then in the collapsed condition shown with the stem 26 in a relatively extended position. As seen in FIGURE 3, however, when the inlet valve 46 and outlet valve 52 are open, the pantograph arrangement will be in the extended position shown, the shaft 58 being then extended relative to the stem 26.

It will be apparent that springs 70 will be extended when the pantograph is in an intermediate dead center or neutral point position with the links 66 fully extended laterally, as seen in FIGURE 2, so that the springs 70 will actuate the pantograph with a snapping action to the extended position of FIGURE 1, when the links 66 pass the dead center position in one direction and to the retracted position of FIGURE 3, when the links 66 pass the dead center position in the other direction.

The apparatus is connected into a flow line in the usual manner by means of suitable inlet pipes, such as those shown at 72 leading to the inlet ports 18 and 20, and outlet pipes 74 leading from the outlet ports 22 and 24.

In the operation of the apparatus, assuming that the valves are in the positions illustrated in FIGURE 1, the stem 26 will be in a position with the spring 44 compressed, and the pantograph will be yieldingly held against longitudinal movement by the springs 70, which are stronger than the springs 44 and 45. In this condition of the apparatus the inflow of fluid through the inlet port 20, and outflow through outlet port 22 will cause the piston 30 to move toward the head 12, and when the piston engages the pin 61 the shaft 26 is moved with the piston toward the head to move the pantograph to its neutral or dead center position, in which the pantograph is not exerting any longitudinal force on the stem 26. As soon as the pantograph reaches its neutral or dead center position, the stem 26 is suddenly moved away from the head 12 by the spring 44, causing the valves 46, 48, 50 and 52 to be closed momentarily by their springs, and at the same time the pantograph is moved out of its neutral position, whereupon the spring 70 actuates the stem 26 to open the inlet valve 46 and outlet valve 52 while closing valves 48 and 50, thus allowing an inflow of fluid through port 18 and outflow through port 24 to move the piston back toward head 14.

The above described operation of the apparatus is repeated as the piston moves back toward the head 14, and the apparatus continues to operate in this manner as long as the fluid continues to flow in the flow line into which the meter is connected.

It will be apparent that due to the fact that the outlet valves 48 and 52 are connected to the rocker arms 36 and 38 at greater distances from the pivot pins 40 than are the inlet valves 46 and 50, the outlet valves will be opened somewhat wider than the inlet valves, so that there will be no back pressure on the piston 30, such as might otherwise result if the inlet and outlet valves were opened only to the same extent.

Due to the simultaneous, momentary closing of all of the valves immediately after the pantograph passes its neutral or dead center position, there will be no flow of fluid while the reversal of the valves is taking place, thus eliminating the error resulting from the continuance of flow which would otherwise take place during the opening and closing movements of the valves. Moreover, the provision of the springs 44 and 45 for actuating the tubular stem to actuate the valves effectively prevents locking of the mechanism against reversal of the valves when the piston reaches one or the other of the limits of its longitudinal movement or with the valves in closed condition, thus assuring the continuous, uninterrupted operation of the meter.

The apparatus also includes mechanism for recording the movements of the piston 30, whereby the volume which passes through the apparatus may be accurately determined. The recording mechanism includes a suitable supporting frame, generally designated 100, which may be disposed in a housing 102 suitably mounted on the meter externally of the cylinder 10, as shown in FIGURE 6, and upon which a pair of bevel gears 104, 106 are mounted for rotation on a common shaft 108 rotatably carried on the frame. Each of the gears 104 and 106 is provided with clutch mechanism of a well known type, such as that illustrated in FIGURE 10, including a ring element 110, within which a clutch member 112 is disposed which is keyed to the shaft 108 for rotation therewith.

Each clutch member 112 has external recesses 114 each having a tapered side wall positioned for engagement with a ball or roller 116 in each recess to engage the ball with the internal periphery of the surrounding ring to cause the shaft 108 to be rotated in one direction with the bevel gear, but which allows the bevel gear to rotate independently of the shaft in the other direction. The clutch mechanisms are arranged to rotate the shaft 108 in the same direction, so that the shaft will be turned by rotation of one gear in one direction and by rotation of the other gear in the other direction. The gears 104 and 106 are rotated by a bevel pinion 118 which is connected to a peripherally grooved wheel or pulley 120 for rotation therewith and to which a coil spring 122 of the clock spring type is attached at one end and anchored at the other end to a fixed location whereby the wheel will be rotated in one direction by unwinding of the spring. A cable or wire 124 is attached at one end to the wheel 120 and extends about the wheel in its external groove 121. The cable or wire 124 is attached at its other end to the piston 30 in cylinder 10 and is slidably extended through the head 12, as seen in FIGURE 5, suitable packing, not shown, being provided in the head to form a fluid tight seal therewith.

The shaft 108 carries a pionion 126 which is meshed with an external gear 128 rotatably mounted in the frame 100 and which carries a friction plate 130 rotatable therewith. A rotatable element 132 is mounted in the frame 100, which element carries a friction member, such as the O-ring 134 positioned for engagement with the plate 130 to rotate the element, and the element is connected to a flexible cable 136 leading to a counter of the usual type, not shown, to rotate the counter.

The rotatable element 130 is mounted for longitudinal sliding movement and is formed with an external groove into which a fork 138 is extended, which is carried by a manually rotatable screw 140 whereby the element may be moved longitudinally to adjust the position of the O-ring 134 on the plate 130, whereby the speed of rotation of the counter cable 136 may be accurately adjusted.

In the operation of the recording mechanism, the wheel 120 will be rotated in one direction as the piston 30 moves toward the head 14 to wind up the spring 122 and to rotate pinion 118 in a direction to turn gear 104 and shaft 108 to rotate the cable 136 to operate the counter. Upon movement of the piston toward the head 12, the spring 122 will rotate the wheel 120 in the other direction to rotate the pinion in a direction to turn gear 106 and shaft 108 to rotate the cable 136 in the same direction as before to operate the counter. By this mechanism the counter will be continuously turned in the same direction as the piston 30 reciprocates to record the operation of the meter. By suitably adjusting the O-ring 134 on plate 130 by means of the screw 140, the operation of the recorder may be coordinated with the movement of the piston 30 to accurately record the amount of fluid flowing through the meter.

It will thus be seen that the apparatus constructed and operated as described above provides a fluid meter having valve actuating means by which inaccuracy due to fluid flow during the opening and closing of the valves is eliminated, wherein the retarding effect of back pressure caused by reduction in the outflow of fluid during the opening movement of the inlet valves is prevented, and wherein malfunctioning of the apparatus due to locking of the valve operating mechanism cannot take place.

The invention is disclosed herein in connection with a particular embodiment of the same, which it will be understood is intended by way of illustration only, it being evident that various changes can be made in the construction and arrangement of the parts, within the spirit of the invention and the scope of the appended claims.

Having thus clearly shown and described the invention, what is claimed as new and desired to secure by Letters Patent is:

1. In fluid metering apparatus the combination of:
   a cylinder, having an inlet port and an outlet port adjacent each end,
   a piston movably disposed in the cylinder for reciprocating movement between the ends of the cylinder,
   an inlet valve for each inlet port and an outlet valve for each outlet port,
   means movably disposed in the cylinder for longitudinal movement therein,
   means forming a movable connection between the inlet valve and outlet valve at each end of the cylinder and said movable means to move the inlet valve at one end of the cylinder and the outlet valve at the other end of the cylinder to their open positions upon movement of said movable means in one direction and to move the inlet valve at said other end and the outlet valve at said one end to their open positions upon movement of said movable means in the other direction, said connecting means including
      lever means pivotally connected mediate its ends to said movable means,
      means forming a pivotal connection between each of said valves and one of said lever means, the pivotal connection of each of said outlet valves with said lever means being located at a greater distance from the pivotal connection of said lever means with said movable means than the pivotal connection of each of said inlet valves with said lever means to cause opening movement of each outlet valve in response to and to a greater extent than the closing movement of the inlet valve at the same end of the cylinder, and
   means positioned for coaction with said piston and said movable means to move said movable means in one direction in response to movement of the piston in one direction and in the other direction in response to movement of the piston in the other direction.

2. The fluid metering apparatus as claimed in claim 1, wherein said movable means is connected to said valves at locations to move all of said valves to closed position prior to the opening of the inlet valve at either end of the cylinder and the opening of the outlet valve at the other end of the cylinder.

3. The fluid metering apparatus as claimed in claim 1, wherein said movable means includes:
   elongated, relatively longitudinally movable elements, one of which is connected to said valves,
   means forming a connection between the elements to cause said one element to move in one direction in response to movement of the other of said elements in one direction and in the other direction in response to movement of said other element in the other direction, and wherein said means positioned for coaction with said piston and said movable means includes means on said other element positioned for coaction with said piston to move said other element in either direction with said piston.

4. The fluid metering apparatus as claimed in claim 1, wherein said movable means includes means for causing said valves to move to their open and closed positions with a snapping action.

5. The fluid metering apparatus as claimed in claim 1, including additionally:

means for recording the movement of said piston in either direction.

6. The fluid metering apparatus as claimed in claim 5, wherein said recording means includes means movable in response to movement of said piston in either direction to record the number of reciprocating movements of the piston.

7. The fluid metering apparatus as claimed in claim 5, wherein said recording means includes rotatable means and means for rotating said rotatable means in the same direction in response to movement of said piston in either direction.

References Cited

UNITED STATES PATENTS

| 1,905,549 | 4/1933 | Bassler | 73—250 |
| 3,107,527 | 10/1963 | Hippen et al. | 73—422 |

FOREIGN PATENTS

| 851,413 | 10/1952 | Germany. | |

RICHARD C. QUEISSER, Primary Examiner

R. S. SALZMAN, Assistant Examiner

U.S. Cl. X.R.

73—250